(12) United States Patent
Wang

(10) Patent No.: US 8,667,550 B2
(45) Date of Patent: Mar. 4, 2014

(54) HOUSE AMPLIFIER WITH RETURN PATH GATING

(71) Applicant: PCT International, Inc., Mesa, AZ (US)

(72) Inventor: Jon-En Wang, Chandler, AZ (US)

(73) Assignee: PCT International, Inc., Mesa, AZ (US)

( * ) Notice: Subject to any disclaimer, the term of this patent is extended or adjusted under 35 U.S.C. 154(b) by 0 days.

(21) Appl. No.: 13/683,938

(22) Filed: Nov. 21, 2012

(65) Prior Publication Data

US 2013/0152151 A1    Jun. 13, 2013

Related U.S. Application Data

(63) Continuation of application No. 12/487,367, filed on Jun. 18, 2009, now abandoned.

(60) Provisional application No. 61/074,898, filed on Jun. 23, 2008.

(51) Int. Cl.
*H04N 7/173* (2011.01)

(52) U.S. Cl.
USPC .......................................... 725/125; 725/127

(58) Field of Classification Search
USPC ................................................ 725/125, 127
See application file for complete search history.

(56) References Cited

U.S. PATENT DOCUMENTS

| 5,016,244 | A | 5/1991 | Massey, Jr. et al. |
| 5,696,895 | A | 12/1997 | Hemphill et al. |
| 5,724,344 | A | 3/1998 | Beck |
| 5,815,794 | A | 9/1998 | Williams |
| 5,826,167 | A | 10/1998 | Jelinek et al. |
| 6,075,784 | A | 6/2000 | Frankel et al. |
| 6,094,211 | A | 7/2000 | Baran et al. |
| H1858 | H | 9/2000 | Ibelings |
| 6,175,565 | B1 | 1/2001 | McKinnon et al. |
| 6,202,169 | B1 | 3/2001 | Razzaghe-Ashrafi et al. |

(Continued)

FOREIGN PATENT DOCUMENTS

| JP | 2004080483 | 3/2004 |
| JP | 2005005875 | 1/2005 |

(Continued)

OTHER PUBLICATIONS

"Clipcomm CP-IOOP," VOIPSupply.com http://www.voipsupply.com/product_info.php?products_id=305, 2 pages printed from Internet Jun. 6, 2005.

(Continued)

*Primary Examiner* — Bennett Ingvoldstad
(74) *Attorney, Agent, or Firm* — Perkins Coie LLP

(57) ABSTRACT

A house amplifier provides automatic gating to selectively block the return path signal in a cable network. The house amplifier includes ports connected to the cable network and to at least one home coaxial outlet. A forward signal path is coupled to pass a forward signal from the cable network. A reverse signal path is coupled to selectively pass a reverse signal from the home to the cable network. The reverse signal path includes a gate configured to block the reverse signal in response to a control signal. A detector circuit detects when the reverse signal is received and activates or deactivates the gate based on the detection. The detector circuit may include a timing circuit configured to provide a delay before deactivating the gate when the reverse signal is no longer detected.

8 Claims, 3 Drawing Sheets

(56) References Cited

U.S. PATENT DOCUMENTS

| | | |
|---|---|---|
| 6,348,837 B1 | 2/2002 | Ibelings |
| 6,373,817 B1 | 4/2002 | Kung et al. |
| 6,477,197 B1 | 11/2002 | Unger |
| 6,640,239 B1 | 10/2003 | Gidwani |
| 6,671,253 B1 | 12/2003 | Alexander, Jr. et al. |
| 6,681,100 B1 | 1/2004 | Ge |
| 6,690,789 B1 | 2/2004 | Hamilton |
| 6,735,302 B1 | 5/2004 | Caine et al. |
| 6,757,910 B1 | 6/2004 | Bianu |
| 6,785,907 B1 | 8/2004 | Dan et al. |
| 6,788,169 B1 | 9/2004 | Schemmann et al. |
| 6,839,829 B1 | 1/2005 | Daruwalla et al. |
| 6,993,286 B2 | 1/2006 | Zhen et al. |
| 7,093,054 B1 | 8/2006 | Goldman |
| 7,254,827 B1 | 8/2007 | Terreault |
| 7,530,091 B2 | 5/2009 | Vaughan |
| 7,675,843 B2 | 3/2010 | Geile |
| 7,707,615 B2 | 4/2010 | Musser et al. |
| 2002/0010817 A1 | 1/2002 | Yeh |
| 2002/0083476 A1 | 6/2002 | McNamara |
| 2002/0101818 A1 | 8/2002 | Teixeira |
| 2003/0014765 A1 | 1/2003 | Ljungdahl et al. |
| 2003/0066082 A1 | 4/2003 | Kliger et al. |
| 2003/0214939 A1 | 11/2003 | Eldumiati et al. |
| 2004/0027992 A1 | 2/2004 | Volkening et al. |
| 2004/0170160 A1 | 9/2004 | Li et al. |
| 2005/0026571 A1 | 2/2005 | Yang et al. |
| 2005/0169056 A1 | 8/2005 | Berkman et al. |
| 2006/0035602 A1 | 2/2006 | Young et al. |
| 2006/0063508 A1 | 3/2006 | He et al. |
| 2006/0205442 A1 | 9/2006 | Phillips et al. |
| 2006/0248567 A1 | 11/2006 | Vanderhoff et al. |
| 2009/0098831 A1 | 4/2009 | Deng et al. |
| 2009/0320085 A1 | 12/2009 | Wang |
| 2010/0095344 A1 | 4/2010 | Newby et al. |
| 2010/0223651 A1 | 9/2010 | Wang |

FOREIGN PATENT DOCUMENTS

| | | |
|---|---|---|
| WO | WO-9608925 | 3/1996 |
| WO | WO-03056728 | 7/2003 |
| WO | WO-2011/142940 | 11/2011 |

OTHER PUBLICATIONS

Bi-directional amplifiers by the Twister Group, 3 pages printed Jul. 9, 2008, http://www.thewistergroup.com/category/new-arrivals-pico-macom.html.

Dual direction transmission diplex drop amplifier by Alibaba.com, 2 pages pritned Jul. 9, 2008, http://www.alibaba.com/catalog/20591299/Diplex__Drop__Amplifier.html.

Non-Final Office Action, U.S. Appl. No. 12/487,36, Date of Mailing Sep. 2, 2011, 10 pages.

International Search Report and Written Opinion; International Patent Application No. PCT/US2011/033086; Filed Apr. 19, 2011; Applicant: PCT International, Inc.; Mailed on Jul. 27, 2011 (8 pages).

Non-Final Office Action, U.S. Appl. No. 12/778,941, Filed Jan. 11, 2013; Applicant PCT International, Inc.; Mailed on Jan. 11, 2013 (15 pages).

HOUSE AMPLIFIER WITH RETURN PATH GATING

CROSS-REFERENCE TO RELATED APPLICATIONS

The present application is a continuation of U.S. patent application Ser. No. 12/487,367, filed Jun. 18, 2009, which claims the benefit and priority to U.S. Provisional Patent Application No. 61/074,898, filed Jun. 23, 2008, the disclosures of which are incorporated herein by reference in their entireties.

BACKGROUND OF THE INVENTION a) Field of the Invention

The present invention relates to video, voice, and data communications in a CATV (cable television) network. More particularly, the present invention is capable of improving return path signal quality of the traditional HFC (hybrid fiber coax) network architectures used by CATV service providers, consequently allowing for longer transmission distances, higher signal modulation formats in the order of higher order of M-QAMs, and higher network reliability.

b) Description of the Prior Art

Communications networks today are required to provide higher and higher bandwidth as subscriber bandwidth demands grow due especially to Internet applications such as file sharing, video conferencing, ecommerce, consumer video production and subsequent posting to sites such as Youtube, etc. While many ILECs (incumbent local exchange carriers) and CLECs (competitive local exchange carriers) have taken the approach of completely rebuilding their networks using fiber-based technologies such as GPON, this has resulted in both expensive plant upgrades and equipment replacement. Existing copper plants are replaced by fiber builds. DSL modems are replaced with GPON ONTs and IP settop boxes are deployed to consumer homes, while complete digital headends have to be built.

CATV operators have in the past 20 years progressed from being entertainment providers to being also broadband providers and then voice service providers. However, CATV operators face the same bandwidth demand growth. Different solutions have been applied, which include higher modulation schemes in both forward path (downstream) and return path (upstream) signals. Currently many CATV operators use 256 QAM modulation for downstream signals, and are actively migrating from 16 QAM to 64 QAM for upstream return path signals.

As higher levels of modulation are used, the required signal to noise ratio (signal quality) increases. This means that the good signals originating from cable modems, eMTA and cable settop boxes must be at a sufficient power level above unwanted interfering noise to ensure good data transmission quality. Furthermore, the popular use of eMTAs for VoIP service means that data communications over the HFC network need to progress from previous a best-effort service to a guaranteed level to ensure quality of voice communications.

In an HFC plant, most of the unwanted noise signals enter the HFC plant from the home. This can be caused by any combination of unterminated coaxial F-ports; bad shielding of televisions, VCRs, or cable boxes; and low quality RF amplifiers with either bad shielding, self oscillations, return loss, or distortions which all combine to allow ingress of noise.

HFC networks employ the DOCSIS standard for bi-directional data transmission. The DOCSIS cable modem and eMTA in the home transmits return path data as needed in bursts. This means that when not actively transmitting data, the cable modem is inactive. Cable settop boxes also use a burst mode transmission pattern, sending return path signals only when the home user orders a particular movie from the VOD or PPV service. However, despite of the burst nature of return path signals, present HFC plant design provides for a return signal path that is always open, so that ingress noise is transmitted even though no active transmission is taking place.

Since ingress noise from all the homes are added together because of the noise funneling effect of the HFC plant (FIG. 1), this noise funneling effectively sets the limit on the number of homes per node, as well as the highest modulation level that can be used. In order to reduce ingress noise so that higher modulation levels can be used, CATV operators have to reduce node sizes, which require expensive HFC plant upgrades consisting of new optical fiber deployment and capital equipment investment.

SUMMARY OF THE INVENTION

This invention eliminates the problem of ingress noise addition in the HFC coaxial plant by implementing a solution as shown in FIG. 2. In this implementation, an RF gate in the form of an RF switch or variable attenuator is added to the return signal path portion of a house amplifier so that when no RF signal is present, the RF signal path is switched off and no ingress noise contribution can enter the HFC coaxial plant from the home to which the house amplifier is connected.

In previous implementations of devices for troubleshooting return path ingress noise issues, the RF gate mentioned above is turned on or off by a user through remote signaling. This approach can only be used for troubleshooting, where attempt is made to identify sources of ingress noise. This approach has limitations in that a) only identification of the source of noise is made, but no improvement is made through this method; b) accurate detection or identification of the source of noise may not be possible due to the transient nature of certain ingress noise sources; c) direct manipulation is required of a human operator; d) network availability is interrupted; and e) repair is not always possible especially when ingress noise originates in a customer's home.

This invention uses an automatic detection circuit (FIG. 3) consisting of a high speed RF detector, a amplifier, and a timing circuit to detect the presence of RF return path signals from a cable modem, eMTA, or settop box. Once the presence of the RF signal above a certain signal threshold level is detected, the detection circuit with turn on the RF gate, allowing RF signal to pass through. The timing circuit enables a fast turn on of the RF gate, with a turn off delay to ensure all signals pass through before the RF gate is shut off.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

The present invention may be embodied in a house amplifier. The house amplifier may be installed on the side of the house, in a garage or basement. The said house amplifier may be called by other names such as drop amplifier, RF amplifier, and CATV amplifier. The house amplifier can consist of any number of output ports (commonly from single port devices to as many as 24 output ports), active or passive forward path amplification, and active or passive return path amplification.

Figure 1:
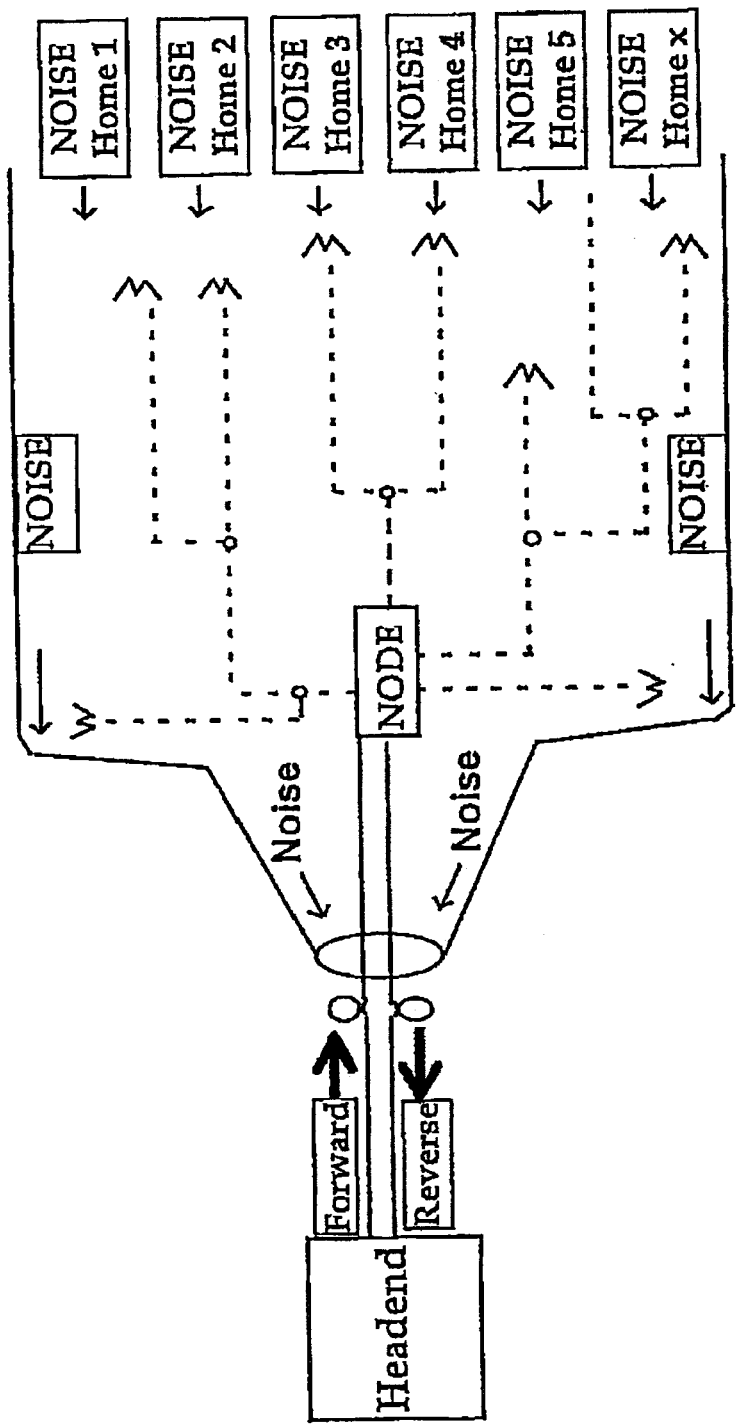
FIG. 1—Return path noise funneling. In a traditional HFC plant, RF signals are combined, which results in ingress noise from all subscriber homes to be added together, which negatively impacts the SNR (signal to noise ratio) of the system.
Figure 2:
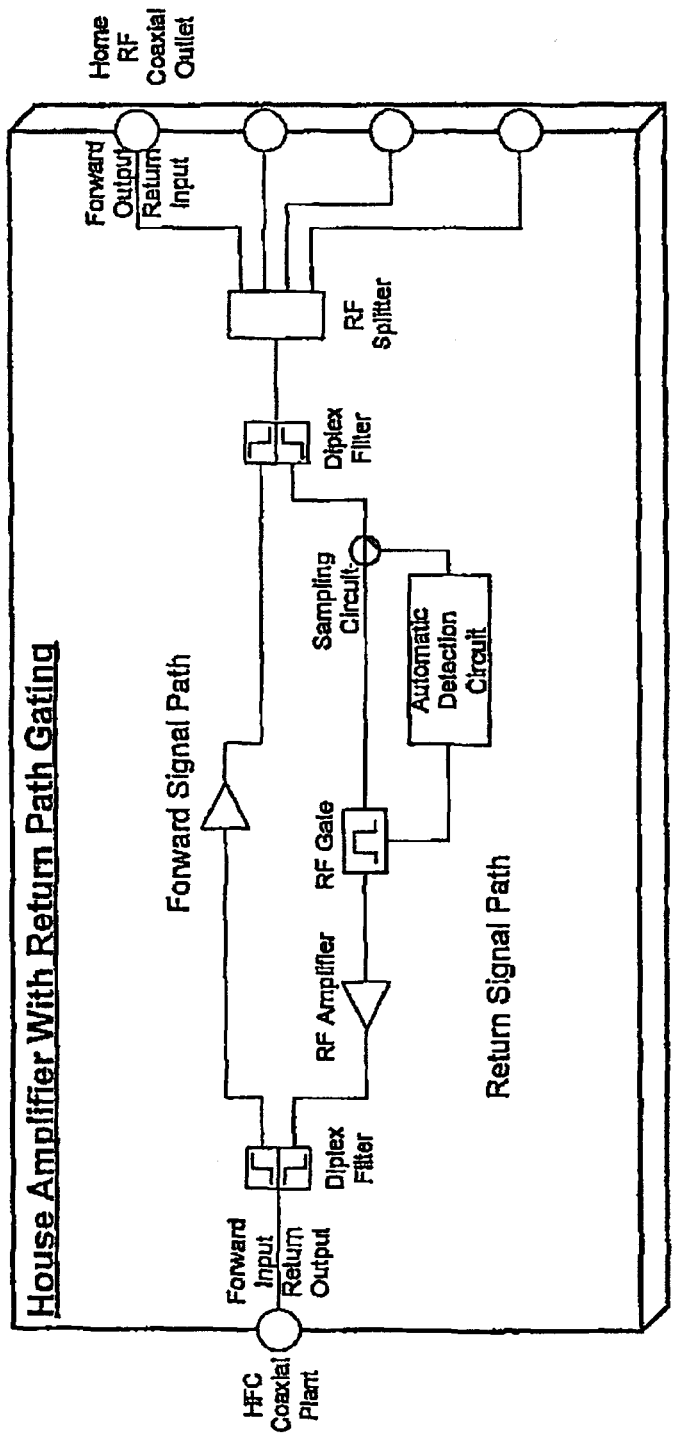
FIG. 2—House amplifier with return path gating. Return signal path of a house amplifier is gated so that ingress noise is blocked when RF return transmission is not active, so that no noise contribution is received from inactive return path.

FIG. 2 shows a functional block diagram illustrating an exemplary house amplifier. The exemplary house amplifier comprises of a pair of diplex filters to separate forward signal path from return signal path, optional RF amplifiers for forward and return signal path, RF sampling circuit, automatic detection circuit, and RF gate.

Figure 3:
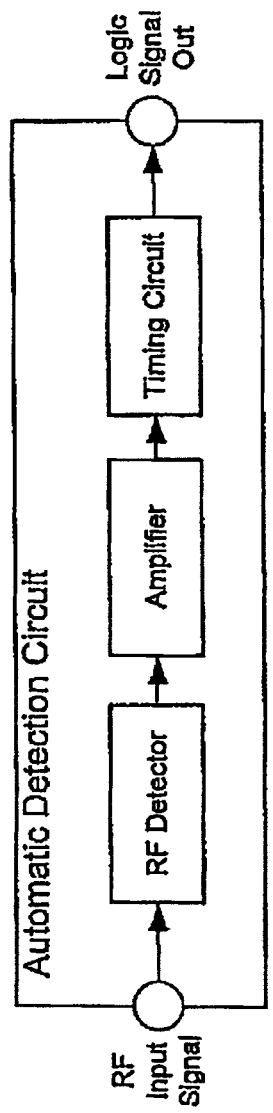
FIG. 3—Automatic detection circuit. Automatic detection and control logic output to automatically turn on RF gate when return RF signal is present, and automatically turn off the RF gate when no return RF signal is present.

When a return path RF signal enters the house amplifier through the Return Input port shown in FIG. 2, it is routed by the diplex filter to the Return Signal Path. The Sampling Circuit further routes a portion of this signal to the Automatic Detection Circuit of FIG. 3. The RF Detector shown in FIG. 3 demodulates the RF signal and outputs the demodulated signal to provide a voltage output level corresponding to the RF signal power of the source signal. The amplifier in FIG. 3 further amplifies this voltage output level so that on or off conditions can be detected using standard logic components. Either CMOS or TTL logic can be used depending on the gain of the amplifier, which can be implemented simply using operational amplifiers and feedback gain control. The Timing Circuit shown in FIG. 3 allows a fast on, slow off control of the RF gate to prevent data loss.

The RF Gate shown in FIG. 2 can be implemented through the use of a) RF switch for complete on/off control, or b) voltage controlled attenuator for full on, partial off control.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A communication system comprising:
a house amplifier comprising:
   a first port configured to connect to a cable network;
   a second port configured to connect directly to a home coaxial outlet;
   a forward signal path coupled between the first port and the second port to pass a forward signal received through the first port;
   a reverse signal path coupled between the first port and the second port to pass a reverse signal received through the second port, wherein the reverse signal path comprises:
   a gate coupled between the first port and the second port and configured to selectively pass the reverse signal;
   a detector circuit configured detect when the reverse signal is received from the second port and to activate the gate when the reverse signal is present and to deactivate the gate when the reverse signal is not present, the detector circuit including:
      a timing circuit configured to activate the gate when the reverse signal is detected and to provide a delay before deactivating the gate when the reverse signal is no longer detected;
   wherein at least one of the forward signal path or the reverse signal path includes a radio frequency signal amplifier.

2. The communications system of claim 1, wherein the gate is an RF switch.

3. The communications system of claim 1, wherein the gate is a variable attenuator.

4. The communications system of claim 1, wherein the reverse signal is received from a cable modem, eMTA, or settop box inside a house.

5. The communications system of claim 1, wherein the detector circuit further comprises:
   a RF detector configured to demodulate the reverse signal and output the demodulated reverse signal to provide a voltage level output corresponding to the power of the signal; and
   an amplifier configured to amplify the voltage level output to a target voltage level such that an on or off condition of the signal can be detected using CMOS or TTL logic components.

6. The communications system of claim 1, further comprising a house.

7. The communications system of claim 1, wherein the forward signal path comprises a forward signal amplifier configured to amplify the signal received through the first port.

8. The communications system of claim 1, wherein the reverse signal path comprises a reverse signal amplifier configured to amplify the signal received through the second port.

* * * * *